March 3, 1970     A. PFEUFFER     3,498,649

PIPE CLAMPING AND CENTERING DEVICE

Filed Aug. 16, 1967     2 Sheets-Sheet 1

INVENTOR.
ANTON PFEUFFER

BY Nolte and Nolte

ATTORNEYS

March 3, 1970     A. PFEUFFER     3,498,649
PIPE CLAMPING AND CENTERING DEVICE
Filed Aug. 16, 1967     2 Sheets-Sheet 2

INVENTOR
ANTON PFEUFFER

BY *Nolte & Nolte*

ATTORNEYS

United States Patent Office 3,498,649
Patented Mar. 3, 1970

3,498,649
PIPE CLAMPING AND CENTERING DEVICE
Anton Pfeuffer, 301 E. 78th St.,
New York, N.Y. 10021
Continuation-in-part of application Ser. No. 518,151,
Jan. 3, 1966. This application Aug. 16, 1967, Ser.
No. 662,844
Int. Cl. F16l 19/00, 17/00
U.S. Cl. 285—365        1 Claim

ABSTRACT OF THE DISCLOSURE

Two pipe sections are joined to form a unitary sealed conduit. The ends of each of the pipe sections are provided with outwardly extending end portions terminating in substantially cylindrical ends. A sealing elastomeric ring is placed between the end portions and a clamp is placed over the outwardly extended ends to achieve a sealed union of the pipe sections.

---

This application is a continuation-in-part of my application Ser. No. 518,151 filed Jan. 3, 1966, now abandoned.

This invention relates to a clamping arrangement for joining the ends of two pipe sections so as to provide a seal for the contents flowing within the pipe.

In the conventional pipe line clamping devices, it is first necessary to fit a flange piece over each end of the pipe lines, which are to be secured to one another, and then to weld the flange piece to the pipe. The welded flange piece thereafter serves as a surface for a clamp which is placed around the flange and which maintains the ends of the pipes together. A flat, circular washer is usually inserted between the flange pieces to provide a seal for the contents flowing through the tube after the clamp is secured thereon.

It is, therefore, an object of the invention to provide an improved arrangement for joining ends of pipe sections.

It is a further object of the invention to provide a simplified seal for pipes and tubes which does not require the welding of flange pieces onto the pieces of tubing which are to be secured to one another.

It is still a further object of this invention to provide a clamping arrangement for connecting tubing which secures the tubing from transverse motion and provides a seal for the contents flowing therethrough.

This invention also contemplates a clamping arrangement for joining devices such as foraminous metallic tubes, metal screens, injectors, venturi tubes or transparent glasses to pipe lines. These devices are inserted within the tube by means of the novel clamping arrangement so as not to produce discontinuity of fluid flow. The clamping arrangement according to the present invention enables the device to be centered within the tubing and sealed therewith, while permitting the device to expand and contract along its length and diameter without fracturing the material of the device.

It is another object of this invention to join pipe tubing together without the need of heavy steel or brass castings such as flanges, bolts, nuts and couplings.

According to the present invention, two pipe tubings are joined which are initially ordinary, straight pieces having no flange at the end portion thereof. By the use of a conventional cold working process, the ends of the tubes are flared to produce a flange.

An elastomeric O-ring is inserted between the flared ends of the tubes and a conventional clamp is tightened around the circumference of the tubes to pull the flange surfaces together and to compress the O-ring, thereby forming the seal between the two tubes.

It is still another feature of the invention to provide a novel method of joining two pipe sections together.

Further objects and features of construction of the present invention will become apparent from a study of the specification taken in conjunction with the attached drawings, in which.

To best understand the improvements derived by the present invention, it would be helpful to briefly describe the presently known methods of clamping pipe tubings.

Figure 1:
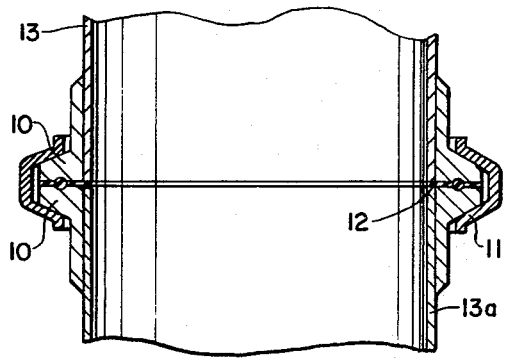
FIG. 1 is a detailed view, in cross section, showing a conventional manner by which two pieces of pipe tubing are connected to each other.

A conventional type of clamp flange is shown in FIG. 1 in which flange pieces 10, 10a are fitted over the respective ends of tubes 13, 13a and are welded thereto. When the ends of the tubes 13, 13a are joined as shown in FIG. 1, the flanges on each tube provide a surface for a clamp 11, which then joins and maintains the ends of tubes 13, 13a together. A flat circular washer 12 is inserted between the mating flange pieces 10, 10a to provide a seal for the contents flowing through the joined tubes 13, 13a after a clamp 11 is secured thereto.

The obvious disadvantage of joining the tubes 13, 13a together, in the manner shown in FIG. 1, is that the flange pieces 10, 10a must first be fabricated, and then fitted over, and secured, welded or rolled, to the outer periphery of each of the tubes 13, 13a so as to provide the clamping and sealing surfaces.

Figure 2:
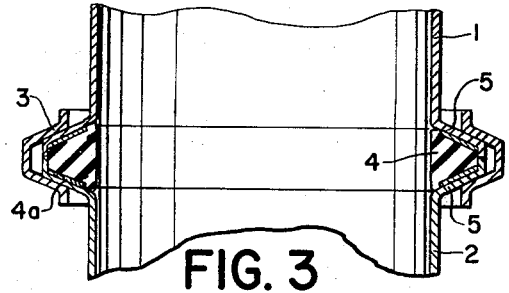
FIG. 2 illustrates the inventive clamping arrangement for joining two lengths of tubing together according to the present invention.

An improved clamping device, according to the present invention is shown in FIG. 2, wherein no additional flange pieces are required for joining or securing the tubes 1 and 2 together.

Initially, tubes 1 and 2 comprises straight pieces having no flanges at the end portions thereof. By using a flaring tool, the ends of the tubes 1 and 2, are flared to produce a matching flare 5. An elastomeric O-ring 4 is inserted between the flared ends 5 of tubes 1 and 2 which are to be joined together. A clamp 3 having rearwardly projecting surfaces, which match the slope of the flared surfaces of the flange 5, is tightened around the circumference of the tubes so as to pull the flared surfaces 5 together and thereby to compress O-ring 4.

A flat gasket 4a, made of metal, rubber or plastic may be inserted on the flared surfaces of the flange so that when the flanges are compressed, a tight seal is formed.

Figure 3:
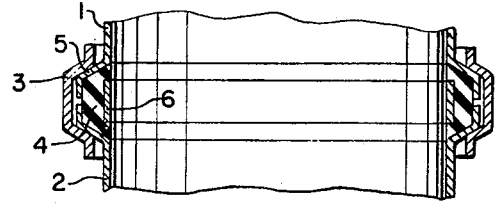
FIG. 3 shows another embodiment of the present invention for use with corrosive liquids.

In FIG. 3 is shown a variation of the embodiment shown in FIG. 2, which finds particular use in an application in which fluids which would normally corrode the sealing gasket, are passed through the pipe sections. For this purpose a circular strip of metal 6, such as a strip of lead or of Carpenter 20 or alloy 20 metal, which will not react with fluids, such as diluted sulphuric acid, is embedded within the inner surface of the sealing gasket or O-ring 4, which would otherwise be in contact with the corrosive fluid flowing through the pipe. Therefore, the sealing between the pipes 1 and 2 is preserved over a long period of usage even though the piping is used to conduct normally corrosive fluids. A clamp 3 is placed over the flares to provide a secure connection between tubes 1 and 2.

Figure 4:
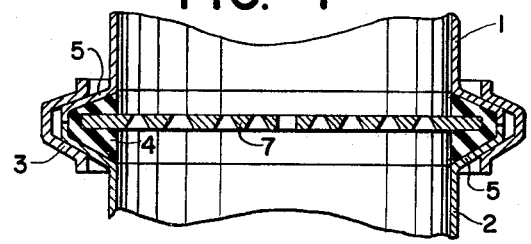
FIG. 4 shows a further embodiment of the inventive arrangement in which the centering of a perforated or dispensing device is shown.

In the embodiment of the invention shown in FIG. 4, a dispensing device such as a perforated plate 7 is centered between the two pipes. The construction of the joint is similar to that shown in FIG. 2. An O-ring 4 embraces the dispensing plate 7 on both sides and accurately keeps the plate in the center of the tubes.

Figure 6:
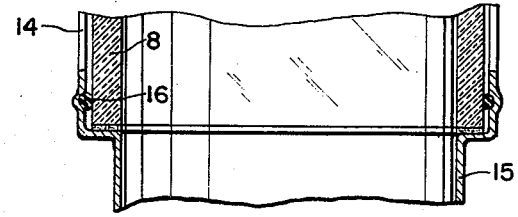
FIG. 6 shows another embodiment of the pipe clamping arrangement according to the present invention showing another manner in which the sight piece can be fitted into the pipes and clamped thereto.
Figure 5:
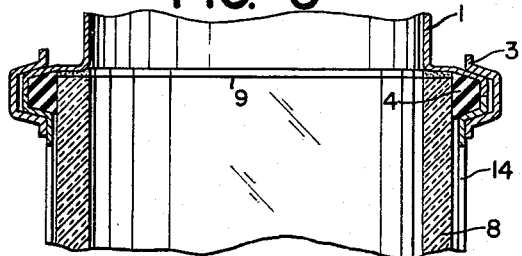
FIG. 5 shows yet another embodiment of the present invention in which a device such as a sight piece is inserted between the tubes.

FIGS. 5 and 6 show embodiments of the present invention in which an additional device, which may be inter alia, a foraminous metallic cylinder, a metal screen, a venturi, or a transparent sight glass etc. is inserted inside tube 14, and mated with tube 1 so that the total structure does not produce any discontinuities in the fluid flow within the structure. With reference to FIG. 5, there is shown by way of example a sight glass 8 which has the same inner diameter as does tube 1 and contains at the mating end thereof a seal 9, preferably made of silicone, cemented thereto to provide a sealing surface against the reclining or straight flare-type flange of tubes 1 or 14 when the sight glass 8 is joined thereto.

An O-ring 4 is inserted intermediate the glass tube 8 and mating tubes 1 and 14 to flexibly retain the sight glass away from the inner walls of tube 14 and to provide an additional sealing surface when the clamp 3 is tightened around the flare-type flanges of tubes 1 and 14.

As seen in FIG. 6, another O-ring 16 is placed between glass 8 and tube 14 to provide further sealing. The sight glass 8, shown in FIGS. 5 and 6, may be secured at the opposite end thereof (not shown) by a similar clamping arrangement or by reducing the diameter of tube 15 to inside diameter of glass 8 as shown in FIG. 6. If tube 14 is then opened at selected areas, it will provide windows along its cylindrical surface. A sight glass is thus created permitting the user to view the contents of the fluids flowing therein.

Due to the temperature changes of the fluid, sight glass 8 will tend to expand and contract, both along its length and diameter, at a rate which is different from that of the metal tubes. In conventional sight glasses where the glass is rigidly joined to the surfaces of the tubes, expansion and contraction of the glass, which is different from that of its supporting tubes, often results in the failure of the glass. In the construction shown in FIG. 6, the O-ring 16 "floats" the glass between the supporting tubes so as to permit the glass to expand in both diameter and length without failing, while still maintaining a seal for the contents flowing within the tubes.

Figure 7:
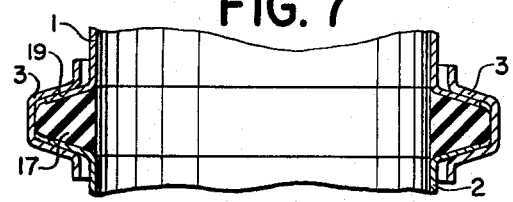
FIG. 7 is a view in cross section showing yet another embodiment of the present invention.

Another embodiment of the present invention is shown in FIG. 7, in which two pipes 1 are each given a flare, by the use of a flaring tool, to produce flares 19 on each pipe 1.

The embodiment in FIG. 7 is distinguishable from that shown in FIG. 2, as the flares are bent merely outwards at an acute angle from the horizontal. In the embodiment of FIG. 7, no vertical bend is given to the flare 16. Between the two flares 16 of each pipe, an elastomeric gasket or circular ring 17 is placed. As in the previous embodiments, a clamp 3 is then placed over both flares 16 and the gasket 17 compressing the flares together against the gasket, causing a deformation of the gasket 17 as shown in FIG. 7. As in the previous embodiments shown, the pipe joint formed is water tight and able to transmit liquids under relatively high pressures without leaking.

The joint is also quite secure and will give long and useful service.

Figure 8:
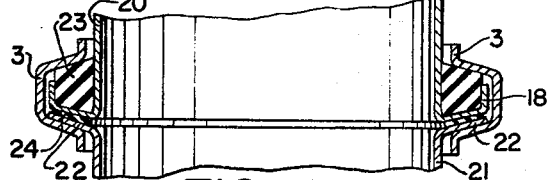
FIG. 8 is a view in cross section showing another embodiment of the present invention.

FIG. 8 shows yet another embodiment in which two pipes 20 and 21 are joined to one another in a sealed relationship. In the upper pipe 20 the end is given a double flare 18 by first flaring the end of the pipe in a substantially horizontal direction, and then given a further flare in a substantially vertical direction. The lower pipe 21 is given merely a single flare 22 which is similar to the flare shown in the embodiment of FIG. 7. Within the double flare 18 a rubber gasket or elastomeric O-ring 23 is placed therein which surrounds the outer circumference of upper pipe 1. To further insure watertight sealing, a flat gasket 24 is placed between the upper surface of flare 22 and the lower surface of flare 18.

A clamp 3 is placed around the flared portions 18 and 22, and over the gasket 23 to provide a secure and watertight joint between pipes 20 and 21.

Figure 9:
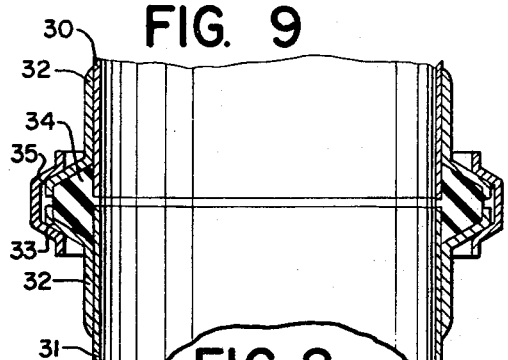
FIG. 9 shows yet another embodiment of the present invention.

Another variation of the basic inventive concept is shown in FIG. 9, in which two pipes 30 and 31 are to be connected together with a minimum of spacing between the pipes. This construction is of value when fluids are to be passed through the pipes at high pressure and when liquids which would normally corrode the sealing gasket are passed therethrough.

As shown in FIG. 9, two substantially identical ferrules 32, each having a flared end 33, are secured to the outer surface of the tubes 30 and 31 by means such as spot welding. The flared end 33 extends vertically and slopes so that the upper portion of the flare 32 extends to the upper portion of tubes 30 or 31. A gasket 34 is disposed in the groove formed by the two flares and the tubes are brought together. A clamp 35, such as that shown in the previous embodiments, is placed over the flared ends of the ferrule 32 to clamp the two tubes together, while providing a seal therebetween.

As seen in FIG. 9, there is practically no area of the gasket 34 which is exposed to the fluid within the tubes as opposed to the embodiments shown in FIGS. 2–8, in which the flare is formed on the tube itself.

Figure 10:
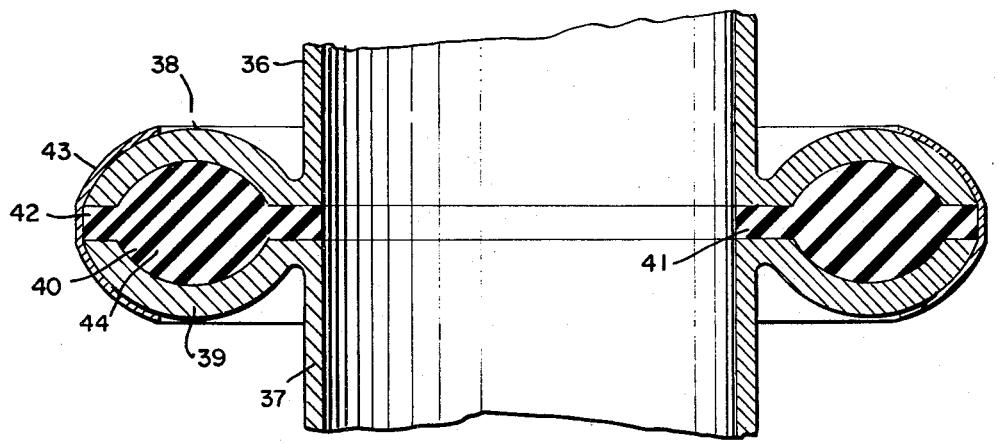
FIG. 10 is a cross-sectional view illustrating yet another embodiment of this invention.

The embodiment of this invention illustrated in FIG. 10 is especially effective in joining together two pipe sections wherein fluid at either vacuum or near vacuum pressures, or at pressures exceeding the ambient pressure, flows through the joined pipe sections. In this embodiment each of the tubular pipe sections 36 and 37 is provided with mirror image, semi-circular annular flanges 38 and 39 respectively. An annular sealing ring 40, made of a suitable elastomeric material such as rubber, is placed in the annular inner groove of the lower flange 39. It is noted that sealing ring 40 has a central portion 44 which is circular in cross-section and opposing extensions 41 and 42 extending laterally from central portion 44.

Pipe section 36 is then placed over pipe section 37, as shown in FIG. 10, so that annular flange 38 comes to rest on top of sealing ring 40. A clamp 43, similar to the clamp 3 disclosed in the embodiments described above, is placed over the outer surfaces of flanges 38 and 39 so as to compress flanges 38, 39 against the outer periphery of sealing ring 40. When clamp 43 is in position, the extensions 41 and 42 project into the space between the flanges 38 and 39. Due to the pressure exerted by the clamp 43, the extensions 41 and 42 are forced against the inner surfaces of annular flanges 38 and 39 to create an effective seal between the tube sections 36 and 37.

When fluid flows through the conduit formed by the two joined pipe sections at vacuum or near vacuum pressures, the ambient pressure exerts a force upon flanges 38 and 39 against the extensions 41 and 42 of sealing ring 40. The force exerted on the extensions 41 and 42 by flanges 38 and 39 increases the effectiveness of the seal provided.

When the pressure of the fluid flow within the conduit is greater than the ambient pressure, the pressure differential between the inner and outer areas of the pipe connection causes the extensions 41 and 42 to press against flanges 38 and 39 to once again increase the effectiveness of the seal.

What is claimed is:

1. An improved pipe assembly comprising a first tube, a second tube positioned in confronting coaxial relationship with said first tube, first and second outwardly extending portions formed integrally with the confronting ends of said first and second tubes, respectively, first resilient means creating a fluid tight seal between the confronting ends of said first and second tubes, means clamping said first and second outwardly extending portions into sealing engagement with said first resilient means, said first outwardly extending portion comprising a first segment planarly juxtaposed to said second outwardly extending portion and a second segment extending from said first segment substantially parallel to said first tube and away from said second tube, and second resilient means positioned within and substantially filling and conforming to the shape of the annular groove defined by said first tube and first and second segments, said second resilient means extending axially beyond the terminal end of said second segment, said clamping means engaging and substantially enclosing said second resilient means and said second outwardly extending portion.

References Cited

UNITED STATES PATENTS

| 323,731 | 8/1885 | Phillips | 285—363 |
| 448,717 | 3/1891 | Hogan | 285—334.5 X |
| 1,042,730 | 10/1912 | Walquist | 285—93 |
| 1,043,412 | 11/1912 | Faunce | 285—407 |
| 1,119,564 | 12/1914 | Austin et al. | 138—40 X |
| 1,662,954 | 3/1928 | Broido | 285—368 X |
| 2,441,754 | 5/1948 | Cobi | 285—365 X |
| 2,489,587 | 11/1949 | Rice | 285—416 X |
| 2,789,844 | 4/1957 | Kessler | 285—336 |
| 2,790,661 | 4/1957 | Tamminga | 285—45 X |
| 2,842,385 | 7/1958 | Webster et al. | 285—408 |

FOREIGN PATENTS

| 819,024 | 10/1951 | Germany. |
| 566,329 | 12/1944 | Great Britain. |
| 973,637 | 10/1964 | Great Britain. |

DAVID J. WILLIAMOWSKY, Primary Examiner

D. W. AROLA, Assistant Examiner

U.S. Cl. X.R.

285—93, 336, 424